(12) United States Patent
Byrne et al.

(10) Patent No.: US 8,363,054 B2
(45) Date of Patent: Jan. 29, 2013

(54) LOCALIZED LAYOUT AND ROUTING IN AN INTERACTIVE DIAGRAMMING SYSTEM

(75) Inventors: Andrew Jude Byrne, Redmond, WA (US); Timothy Garry Dwyer, Seattle, WA (US); Durham Montgomery Goode, Redmond, WA (US); Yanlin Hou, Sammamish, WA (US); Jens K. Jacobsen, Seattle, WA (US); Sadi Sufi Khan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 281 days.

(21) Appl. No.: 12/816,838

(22) Filed: Jun. 16, 2010

(65) Prior Publication Data

US 2011/0310117 A1   Dec. 22, 2011

(51) Int. Cl.
*G06T 11/20* (2006.01)
(52) U.S. Cl. ......... 345/440; 345/672; 345/676; 345/680
(58) Field of Classification Search .................. None
See application file for complete search history.

(56) References Cited

U.S. PATENT DOCUMENTS

| | | | |
|---|---|---|---|
| 7,603,632 B1 | 10/2009 | Aamodt et al. | |
| 2004/0098670 A1* | 5/2004 | Carroll | 715/517 |
| 2005/0134589 A1* | 6/2005 | Heer et al. | 345/440 |
| 2006/0181440 A1* | 8/2006 | Ackermans et al. | 341/51 |
| 2007/0027839 A1* | 2/2007 | Ives | 707/3 |
| 2008/0012859 A1* | 1/2008 | Saillet et al. | 345/440 |
| 2009/0089715 A1 | 4/2009 | Dickey | |
| 2009/0300570 A1 | 12/2009 | Chan | |
| 2009/0327954 A1 | 12/2009 | Danton et al. | |

OTHER PUBLICATIONS

Dunnart: A Constraint-based Network Diagram Authoring Tool—Published Date: 2009 http://www.csse.monash.edu.au/~tdwyer/authoring-tool.pdf (12 pages).
Topology Preserving Constrained Graph Layout—Published date: 2009 http://www.csse.monash.edu.au/~tdwyer/topology.pdf (12 pages).

(Continued)

*Primary Examiner* — Kee M Tung
*Assistant Examiner* — Ryan D McCulley
(74) *Attorney, Agent, or Firm* — Workman Nydegger

(57) ABSTRACT

Embodiments are directed to determining an appropriate neighborhood region for updating a node layout of an interactive diagramming system. A computer system receives an input indicating at least one change to various selected nodes displayed in the interactive diagramming system, where the changes to the selected nodes affect the positions of the other nodes on the node layout. The computer system traverses adjacent node edges to determine s minimal node neighborhood to which the node changes are to be applied. The computer system accesses diagram parameters that identify diagram and node characteristics and determines the minimal neighborhood region based on both the determined number of adjacent nodes and the accessed parameters. The computer system also updates the position of the selected node and the updated positions of those nodes and corresponding edges that are determined to be within the neighborhood region.

20 Claims, 4 Drawing Sheets

OTHER PUBLICATIONS

An Experimental Study on Distance-Based Graph Drawing—Published Date: 2008 http://www.inf.uni-konstanz.de/algo/publications/bp-esdgd-09.pdf (12 pages).

yEd Diagram Editor 3.4.1—Published date: Dec. 15, 2009 http://download.cnet.com/yEd-Diagram-Editor/3000-2075_4-10222192.html (7 pages).

Exploration of networks using overview+detail with constraint-based cooperative layout http://www.csse.monash.edu.au/~marriott/DwyMarSch08.pdf (8 pages).

Scalable, Versatile and Simple Constrained Graph Layout http://www.csse.monash.edu.au/~tdwyer/Dwyer2009FastConstraints.pdf (8 pages).

Topological Fisheye Views for Visualizing Large Graphs http://www2.research.att.com/~north/papers_videos/pdf/DBLP-conf-infovis-GansnerKN04.pdf (8 pages)

Michael Wybrow, Kim Marriott, and Peter J. Stuckey. Incremental Connector Routing. In Proceedings of 13th International Symposium on Graph Drawing (GD'05), LNCS 3843, pp. 446-457. Springer-Verlag, 2006.

* cited by examiner

LOCALIZED LAYOUT AND ROUTING IN AN INTERACTIVE DIAGRAMMING SYSTEM

BACKGROUND

Computers have become highly integrated in the workforce, in the home, in mobile devices, and many other places. Computers can process massive amounts of information quickly and efficiently. Software applications designed to run on computer systems allow users to perform a wide variety of functions including business applications, schoolwork, entertainment and more. Software applications are often designed to perform specific tasks, such as word processor applications for drafting documents, or email programs for sending, receiving and organizing email.

In some cases, software applications are designed to display diagrams, charts and other types of data presentations. Such software typically displays various nodes with lines or, more formally, "edges" connecting the nodes. The nodes may represent different diagram elements and the connecting edges may represent a link between the nodes. In some cases, when designing such a chart or diagram, a user may want to make changes to the positioning, scale or rotation of a selected node or group of nodes. Such position changes affect not only the repositioned node(s) but also the other nodes of the node diagram.

To deal with the repositioning of nodes, especially nodes in displayed in a large node diagrams, incremental data structures are often pre-calculated and stored in a repository. Then, when a node is repositioned, the diagram system implements the pre-computed incremental data structured along with real-time updates to the data structures. This process can be very computationally expensive.

BRIEF SUMMARY

Embodiments described herein are directed to determining an appropriate neighborhood region for updating a node layout of an interactive diagramming system. In one embodiment, a computer system receives an input indicating at least one change to various selected nodes displayed in the interactive diagramming system, where the changes to the selected nodes affect the positions of the other nodes on the node layout. The computer system traverses adjacent node edges to determine s minimal node neighborhood to which the node changes are to be applied. The computer system accesses diagram parameters that identify diagram and node characteristics and determines the minimal neighborhood region based on both the determined number of adjacent nodes and the accessed parameters. The computer system also updates the position of the selected node and the updated positions of those nodes and corresponding edges that are determined to be within the neighborhood region.

Other embodiments are directed to continually adjusting the size of a neighborhood region to maintain a minimum level of diagramming system responsiveness. In one embodiment, a computer system determines that a neighborhood region has been established for a node diagram displayed an interactive diagramming system. The computer system measures a level of lag between the user input and the diagramming system's response to the user input. The computer system also, based on the measured lag level, dynamically varies the size of the neighborhood region to maximize neighborhood region size while maintaining a level of lag below a maximum lag level.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Figure 1:
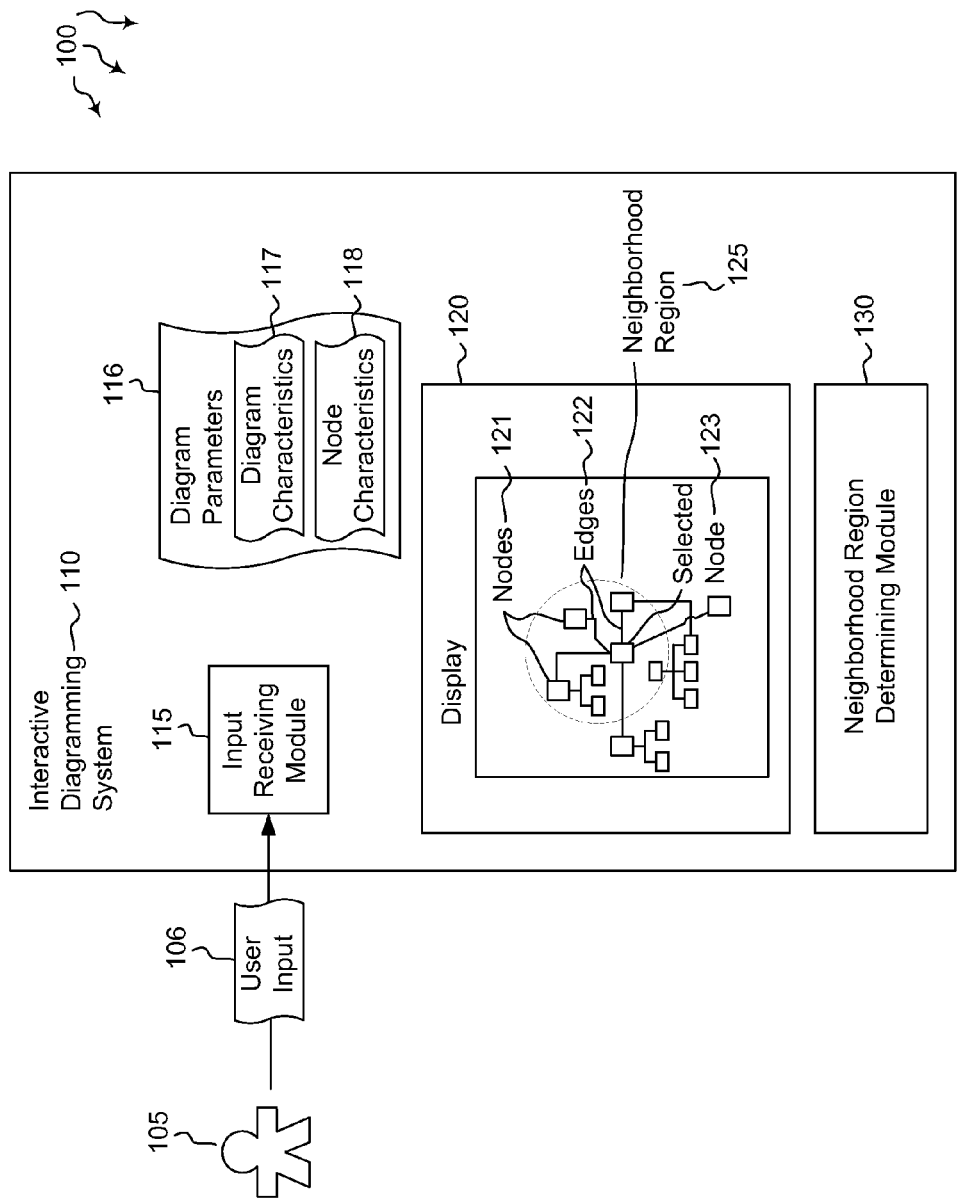
FIG. 1 illustrates a computer architecture in which embodiments of the present invention may operate including determining an appropriate neighborhood region for updating a node layout of an interactive diagramming system and continually adjusting the size of a neighborhood region to maintain a minimum level of diagramming system responsiveness.

Embodiments described herein are directed to determining an appropriate neighborhood region for updating a node layout of an interactive diagramming system. In one embodiment, a computer system receives an input indicating at least one change to various selected nodes displayed in the interactive diagramming system, where the changes to the selected nodes affect the positions of the other nodes on the node layout. The computer system traverses adjacent node edges to determine s minimal node neighborhood to which the node changes are to be applied. The computer system accesses diagram parameters that identify diagram and node characteristics and determines the minimal neighborhood region based on both the determined number of adjacent nodes and the accessed parameters. The computer system also updates the position of the selected node and the updated positions of those nodes and corresponding edges that are determined to be within the neighborhood region.

Other embodiments are directed to continually adjusting the size of a neighborhood region to maintain a minimum level of diagramming system responsiveness. In one embodiment, a computer system determines that a neighborhood region has been established for a node diagram displayed an interactive diagramming system. The computer system measures a level of lag between the user input and the diagramming system's response to the user input. The computer system also, based on the measured lag level, dynamically varies the size of the neighborhood region to maximize neighborhood region size while maintaining a level of lag below a maximum lag level.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1 illustrates a computer architecture 100 in which the principles of the present invention may be employed. Computer architecture 100 includes interactive diagramming system 110. Interactive diagramming system 110 (or "system 110") may include any type of layout or diagramming system that allows users to view, manipulate, interact with or visualize a node diagram, graph or other layout. System 110 may allow a user to create, edit, delete, reposition or otherwise interact with nodes in the layout. The system 110 may also allow a user to import existing layouts, convert existing data sets or software code portions to node layouts, create new layouts or diagrams or otherwise obtain layouts.

These layouts or diagrams (sometimes referred to herein as node diagrams, node trees, graphs, node layouts, charts, etc.) may be displayed in display 120. In some embodiments display 120 may be separated from system 110 and may be a standalone display. Display 120 may be any type of computer display capable of displaying digital or analog video content. As shown in FIG. 1, display 120 may display various nodes 121 and edges 122. The edges are the lines or other connectors that connect nodes to each other. In some embodiments, steps are taken to ensure that the edges are routed between nodes in an optimal fashion with short edges and minimal edge overlap.

Interactive diagramming system 110 is further configured to receive input from a user or other computer or software program. For instance, system 110 may receive user input 106 from user 105. Input receiving module 115 may receive the user input, whereafter system 110 determines how to interpret and apply that input. In some cases, user 105 may desire to reposition or otherwise manipulate a node displayed in display 120. Thus, for example, a user may select a node (e.g. node 123) using a mouse or other input device (e.g. a touch gesture in cases where display 120 is a touch screen) and move that node to a new position in the display. Such node movement affects not only the selected node 123, but also other surrounding nodes and their corresponding edges. Moreover, when nodes are moved, constraints between the nodes requiring certain node groupings or edge connections may increase the amount of processing needed to properly calculate an updated graph.

It should be noted that, in cases where touch screens are used to display node diagrams, multiple simultaneous inputs may be received from one or many users. Each input may select a different node. In such cases, multiple different neighborhood regions may be used, or a single region may be used that encompasses each of the selected nodes. Moreover, in these and other cases, constraints between nodes may apply to those nodes that are currently displayed on display 120 as well as to other offscreen nodes that are not currently displayed. Thus, when a single node or multiple nodes are selected, constraints of the surrounding nodes (including the offscreen nodes) may be considered as the user's inputs are applied to the node diagram.

To ensure that the user's node movement is applied to the layout in a timely and efficient manner, a neighborhood region 125 may be calculated which limits how far within the diagram the effects of the selected node's movement are propagated. The limited propagation will allow a faster response time between the user's input and the system's response. Hence, instead of calculating how the selected node's movement affects each node in the entire layout (including any offscreen nodes), only the effects of the selected node's movement within the neighborhood region 125 are calculated. As a result, the user's attention is focused on what the user is doing (i.e. repositioning a selected node) while the nodes on the periphery of the node can be (more easily) ignored.

In some embodiments, the neighborhood region 125 is variable and dynamically determinable. Neighborhood region determining module 130 may access various diagram parameters 116 including different diagram characteristics 117 and/or node characteristics 118. Based on these characteristics, as well as other factors including available processing resources, the neighborhood region may be calculated and recalculated multiple times throughout the user's input. Accordingly, if a user selects a node and drags it to a new location within the layout, while the user is dragging the node, neighborhood region determining module 130 may be continually recalculating how big or small the neighborhood region should be to ensure a proper response time. These and other concepts will be explained in greater detail below with regard to method 200 of FIG. 2 and method 300 of FIG. 3.

Figure 2:
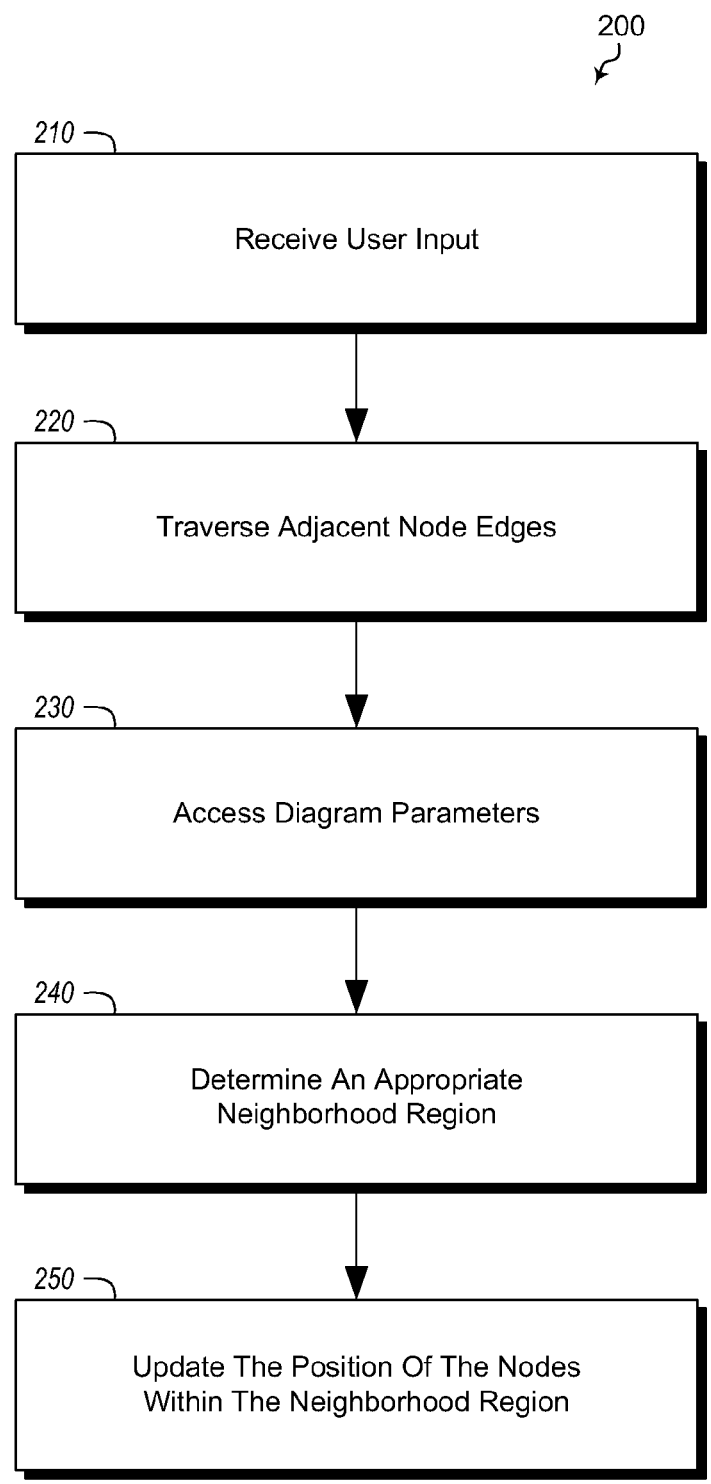
FIG. 2 illustrates a flowchart of an example method for determining an appropriate neighborhood region for updating a node layout of an interactive diagramming system.
Figure 3:
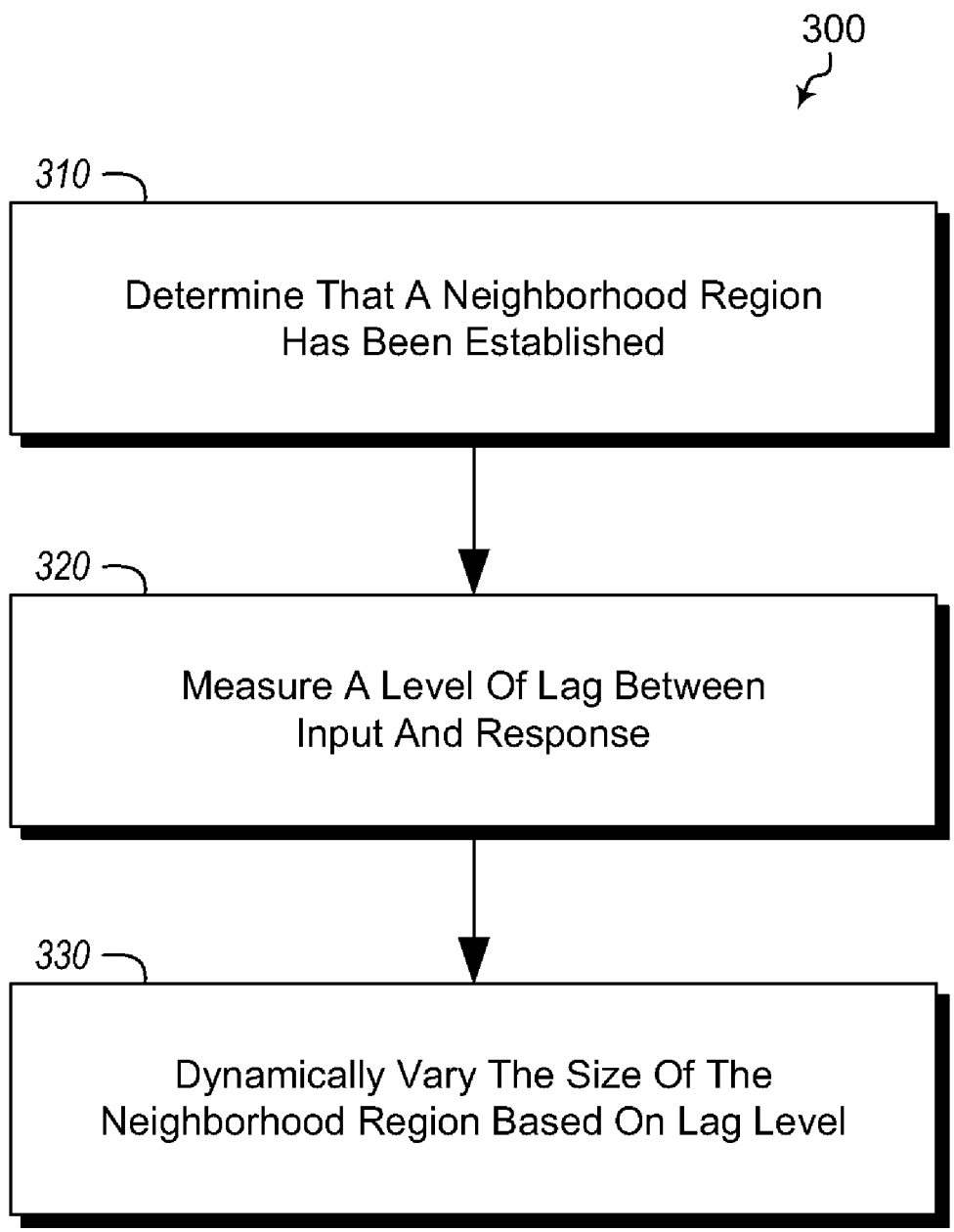
FIG. 3 illustrates a flowchart of an example method for continually adjusting the size of a neighborhood region to maintain a minimum level of diagramming system responsiveness.

In view of the systems and architectures described above, methodologies that may be implemented in accordance with the disclosed subject matter will be better appreciated with reference to the flow charts of FIGS. 2 and 3. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 2 illustrates a flowchart of a method 200 for determining an appropriate neighborhood region for updating a node layout of an interactive diagramming system. The method 200 will now be described with frequent reference to the components and data of environment 100.

Method 200 includes an act of receiving an input indicating at least one change to one or more selected nodes displayed in the interactive diagramming system, wherein the changes to the selected nodes affect the positions of other nodes on the node layout (act 210). For example, input receiving module 115 may receive input 106 from user 105 (or from another software application or computer system) indicating that selected node 123 displayed in display 120 of system 110 is to be repositioned. The input may indicate that the selected node is to be moved to another location on the display or even to a location off the display (i.e. to an offscreen portion of the layout). Additionally or alternatively, the user input may include instructions to apply changes to the selected node, create new nodes or remove the selected node.

Method 200 includes an act of traversing one or more adjacent node edges to determine a minimal node neighborhood to which the node changes are to be applied (act 220). For example, interactive diagramming system 110 may traverse those edges 122 that are connected to selected node 123 to determine how many nodes are within a predefined distance from the selected node. The nodes within the predefined distance may be those nodes that are within the minimal node neighborhood. In some cases, the predefined distance is set by the system 110 as one of the diagram characteristics 117. This predefined distance may be altered by the system or by a user and may be changed in real-time. By identifying the number of nearby nodes, the system 110 can determine how many nodes and edges are going to be affected by any changes to the selected node. This number of nearby nodes may be used in determining an appropriate size for a neighborhood region, as will be explained below.

Method 200 also includes an act of accessing one or more diagram parameters identifying diagram and node characteristics (act 230). For example, interactive diagramming system 110 may access diagram parameters 116 which identify various diagram characteristics 117 and/or node characteristics 118. The diagram parameters identifying diagram and node characteristics may include any or all of the following: an indication of inter-node constraints, an indication of group constraints, a minimum level of diagram responsiveness and an indication of inter-node alignment. Moreover, it should be noted that other parameters may be used and further, that the parameters used may change over time.

The inter-node constraints refer to relationships that exist between nodes and are signified by edges or connectors between nodes. The group constraints refer to nodes that are part of a grouping of nodes. In some cases, these groupings are to maintain a particular shape such as a circle or node tree. As such, the group constraints dictate how the group is to be maintained, despite any changes to nodes surrounding the group that are not members of the group. A minimal level of diagram responsiveness may refer to the time from when an input is received and when the results of that input are displayed. This responsiveness may be represented as lag or a lag level. A maximum lag level would indicate a time beyond which an input is taking too long to be processed and displayed on the display 120. A minimum responsiveness level may be equivalent to a maximum lag level. An indication of inter-node alignment may indicate positionings for nodes that are to be aligned in a specified manner. Each of these diagram parameters (or diagram parameter values) may be individually customizable by a user or other software program.

Some embodiments may actively measure the level of lag between a user input and the diagramming system's response. Then, based on the measured level of lag, the system 110 may dynamically adapt one or more of the diagram parameters to maintain lag at a level below the maximum level of lag. Thus, if the system 110 becomes bogged down with other processing, any one or more of the diagram parameters 116 may be adjusted to reduce lag and increase responsiveness. Alternatively, if system processing resources become available, the diagram parameters may similarly be adjusted to provide more features while maintaining lag below the maximum level.

Method 200 includes an act of determining the minimal neighborhood region based on both the determined number of adjacent nodes and the accessed parameters (act 240). For example, neighborhood region determining module 130 may determine minimal neighborhood region 125 based on both the number of traversed adjacent nodes and the diagram parameters 116. The neighborhood region 125 may be substantially any size and any shape and many include any number of nodes. As shown in FIG. 1, the neighborhood region 125 may be circular in shape and may include those nodes that are within the circle and exclude those nodes that are outside the circle. In cases where one node of a group of nodes is included in the neighborhood region while the other nodes of the group are not, diagram parameters 116 may dictate whether only the node in the neighborhood region is moved or whether the whole group (including those nodes that are part of the group but are outside the neighborhood group) of nodes are to be moved.

In some cases, interactive diagramming system 110 may measure the its available processing resources and, based on the amount of processing resources that are available, the system may prioritize which nodes are to be included in the neighborhood region based on a predetermined set of node heuristics. Thus, within the limited amount of available processing resources, nodes may be included or excluded from the neighborhood region 125 based on a system of priority. In line with such a system, the shape and/or size of the neighborhood region may be altered to include higher priority nodes and exclude lower priority nodes.

Node display priority properties (or heuristics) which indicate a node's display priority, may include any of the following: which nodes are closest to the selected node 123, which nodes have constraints and, of the nodes that have constraints, which nodes have the highest priority constraints. Other ways of prioritizing which nodes are included in the neighborhood region may include a recent activity metric that indicates which nodes the user has (recently) interacted with, the amount of time since the last click or the frequency of clicks or moves in a given time period. These node display priority properties may vary dynamically based on currently available processing resources. The neighborhood region may also change dynamically based on the changes to the node display priorities. Moreover, as mentioned above, the neighborhood region size may also vary in size and/or shape to maintain lag at a level below a maximum level of lag.

Returning to FIG. 2, method 200 includes an act of updating the position of the selected node and the updated positions of those nodes and corresponding edges that are determined to be within the neighborhood region (act 250). For example, interactive diagramming system 110 may update the position of selected node 123 as well as the positions of the nodes 121 and edges 122 that are determined to be within neighborhood region 125. This updating may occur dynamically in real-time as user input 106 indicating that the selected node is to be repositioned is received. Accordingly, as the user drags the selected node to new positions, the position of those other nodes within the neighborhood region may be continually updated while the user is dragging the node. Moreover, as the user is dragging the node, the size and/or shape of the neighborhood region may be constantly varied to maintain a low lag level. It should be noted that the boundaries of the neighborhood region, while shown in FIG. 1 as a dotted line, may not be shown in some embodiments or may be toggled on or off by a user.

While the node positions are being updated, the edge routing paths may be continually recalculated to keep edges 122 minimally short while also minimizing edge overlaps and/or edge intersections. This process is referred to as "beautification" herein. The beautification process renders the layout more readable to a human user by making the connecting edges, in general, short and direct. The beautification process itself may be increased or decreased, depending on measured lag, system resources, diagram parameters, or other factors. The management of the beautification process may be dynamically varied by itself or in line with other changes (such as to the size or shape of the neighborhood region).

When a user has completed the mouse click or other input gesture, the changes caused by the user's input may be spread to other nodes affected by the repositioning of the selected node 123 to at least those nodes 121 and edges 122 currently displayed on display screen 120. The changes may be further spread to offscreen nodes as permitted by the interactive diagramming system, while maintaining an appropriate level of responsiveness. Thus, the diagramming system's available processing resources may be measured and, based on determining that a threshold level of processing resources are available, the changes may be spread to one or more offscreen nodes. Thus, an appropriate neighborhood size may be determined and changed as necessary to maintain a desired level of responsiveness.

Figure 4:
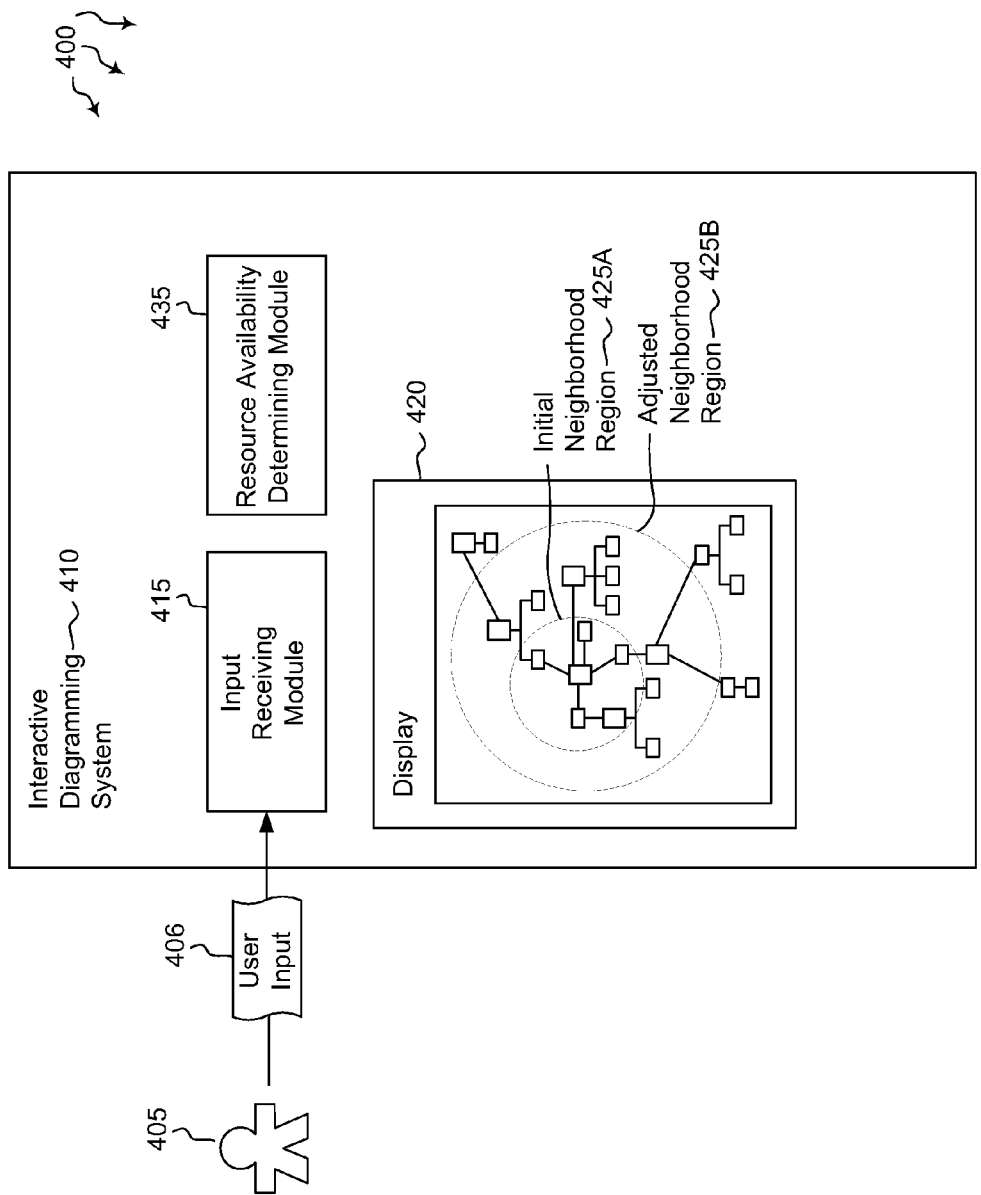
FIG. 4 illustrates an embodiment of the present invention in which a neighborhood region is dynamically changed.

Turning now to FIG. 3, FIG. 3 illustrates a flowchart of a method 300 for continually adjusting the size of a neighborhood region to maintain a minimum level of diagramming system responsiveness. The method 300 will now be described with frequent reference to the components and data of environment 400 of FIG. 4.

Method 300 includes an act of determining that a neighborhood region has been established for a node diagram displayed an interactive diagramming system (act 310). For example, interactive diagramming system 410 may determine that initial neighborhood region 425A has been established for a node diagram displayed in display 420. The initial neighborhood region 425A may have been established as a result of system 410 settings or as the result of an adjustment based on available resources or other system settings. Although the initial neighborhood region 425A is shown as a circle (as is adjusted neighborhood region 425B's), it should be noted that the region may comprise substantially any shape and any size and may be designed to include or exclude certain nodes based on detected constraints.

Method 300 further includes an act of measuring a level of lag between the user input and the diagramming system's response to the user input (act 320). For example, resource availability determining module 435 may measure a lag level between when user input 406 is received from user 405 at input receiving module 415 and when system 410 responds to the input. The lag level may indicate the system's overall level of responsiveness. The better the system's responsiveness, the lower the lag level will be. Thus, if module 435 determines that a high lag level exists, the initial neighborhood region 425A may be adjusted smaller to reduce the level of lag. Conversely, if module 435 determines that a low lag level exists, the initial neighborhood region 425A may be adjusted bigger to provide more feedback without raising the lag level too high (i.e. beyond a maximum threshold lag level).

In some cases, the level of lag may be measured multiple different times during the user's input. Thus, for example, if the user input is a mouse click and drag motion, the lag level may be measured multiple times while the mouse button is clicked and movement inputs are being received from the mouse. The number of times the lag level is measured during the user's input is itself dynamically adjustable and may be adjusted up or down depending on available system resources.

Method 300 includes, based on the measured lag level, an act of dynamically varying the size of the neighborhood region to maximize neighborhood region size while maintaining a level of lag below a maximum lag level (act 330). For example, based on a determined lag level, system 410 may dynamically vary the size of initial neighborhood region 425A to maximize neighborhood region size while maintaining an acceptable level of lag. Accordingly, as mentioned above, if module 435 determines that lag level is low and/or that a certain number of processing resources are available, the initial neighborhood region 425A may be expanded to include more nodes, resulting in adjusted neighborhood region 425B. Accordingly, when inputs are received after the neighborhood region has been enlarged, more nodes will be dynamically repositioned as user input is received than were dynamically repositioned when the smaller initial region was being used.

In some embodiments, various node edges may be routed so that edge routing paths of the node edges are kept minimally short while also minimizing overlaps with other layout objects. These objects may include edges, nodes, diagram objects or other layout items. Such diagram beautification may be dynamically applied as resources are available. In some cases, diagram beautification may be sacrificed to maintain a larger neighborhood region; in other cases, neighborhood region size may be sacrificed to increase focus on short edges that do not overlap. The determination of how much beautification to apply to the diagram may be determined by a user or by the system 410 and may be dynamically adjustable. Additionally or alternatively, the maximum lag level acceptable may be set by a user or by the system 410. Like the other settings described here, the maximum lag level may also be dynamically adjustable and adaptable based on current processing resource availability.

Thus, as described herein, an appropriate neighborhood region may be determined in which a node layout of an interactive diagramming system is updated. Moreover, the size of an established neighborhood region may be continually adjusted to maintain a minimum level of diagramming system responsiveness.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. In a computer system including a processor and a memory, a computer-implemented method for determining an appropriate neighborhood region for updating a node layout of an interactive diagramming system, the method comprising:

an act of the computer system receiving an input indicating at least one change to one or more selected nodes displayed in the interactive diagramming system, wherein the changes to the selected nodes affect the positions of other nodes on the node layout;

an act of the computer system traversing one or more adjacent node edges to determine a number of adjacent nodes that are within a predefined distance from the selected node for determining a minimal node neighborhood to which the node changes are to be applied;

an act of the computer system accessing one or more diagram parameters identifying diagram and node characteristics, the one or more diagram parameters including an indication of one or more inter-node constraints between the adjacent nodes;

an act of the computer system determining the minimal neighborhood region based on both the determined number of adjacent nodes and the accessed parameters, including selecting the minimal neighborhood region to include a first node in the adjacent nodes based on the first node having a higher priority inter-node constraint within the adjacent nodes and to exclude a second node in the adjacent nodes based on the second node having a lower priority inter-node constraint within the adjacent nodes; and an act of the computer system updating the position of the selected node and the updated positions of those nodes and corresponding edges that are determined to be within the neighborhood region.

2. The method of claim 1, wherein the act of updating the position of the selected node and the positions of those nodes and corresponding edges that are determined to be within the neighborhood region occurs dynamically in real-time as the inputs indicating changes to the selected node are received.

3. The method of claim 1, wherein the diagram parameters identifying diagram and node characteristics also include at least one of the following: an indication of group constraints, a minimum level of diagram responsiveness and an indication of inter-node alignment.

4. The method of claim 3, wherein at least one of the diagram parameter values is customizable.

5. The method of claim 3, wherein the minimal level of diagram responsiveness indicates a maximum level of lag between the user input and the diagramming system's response.

6. The method of claim 5, further comprising:

an act of actively measuring the level of lag between the input and the diagramming system's response; and an act of dynamically adapting at least one of the diagram parameters to maintain lag at a level below the maximum level of lag.

7. The method of claim 5, further comprising:

an act of actively measuring the level of lag between the input and the diagramming system's response; and an act of dynamically varying the size of the neighborhood region to maintain lag at a level below the maximum level of lag.

8. The method of claim 1, further comprising an act of continually recalculating edge routing paths to keep edges minimally short while also minimizing overlaps with other layout objects.

9. The method of claim 8, wherein the size of the node neighborhood to which the node changes are applied is dynamically varied based on determined available computing resources.

10. The method of claim 1, further comprising an act of spreading changes to other nodes affected by the node changes to at least those nodes and edges currently displayed on a display screen.

11. The method of claim 10, further comprising:

an act of measuring the diagramming system's available processing resources; and based on determining that a threshold level of processing resources are available, an act of spreading the changes to the other nodes to one or more offscreen nodes.

12. The method of claim 1, further comprising:

an act of measuring the diagramming system's available processing resources; and based on the amount of processing resources that are available, an act of prioritizing which nodes are to be included in the neighborhood region based on a predetermined set of heuristics.

13. The method of claim 12, wherein the heuristics include at least one of the following: which nodes are closest to the selected node, which nodes are connected by constraint relationships, node connectivity, user-defined domain-specific priorities and, of the nodes that have constraints, which nodes have the highest priority constraints.

14. The method of claim 13, wherein the heuristics vary dynamically based on currently available processing resources.

15. A computer program product for implementing a method for continually adjusting the size of a neighborhood region to maintain a minimum level of diagramming system responsiveness, the computer program product comprising one or more computer-readable storage media having stored thereon computer-executable instructions that, when executed by one or more processors of the computing system, cause the computing system to perform the method, the method comprising:
  an act of determining that a neighborhood region has been established for a node diagram displayed in an interactive diagramming system, the neighborhood region being based at least on a determined number of adjacent nodes to a selected node in the node diagram;
  an act of measuring a level of lag between receiving user input related to the selected node and the diagramming system's modification to one or more of the adjacent nodes that are in the neighborhood region in response to the user input; and
  based on the measured lag level, dynamically varying the size of the neighborhood region to maximize neighborhood region size while maintaining a level of lag below a maximum lag level, dynamically varying the size of the neighborhood region including changing the number of adjacent nodes that are in the neighborhood region based at least in part on the priority of one or more inter-node constraints that exist between the adjacent nodes.

16. The computer program product of claim 15, wherein the maximum lag level is dynamically adjustable and adaptable based on current processing resource availability.

17. The computer program product of claim 15, wherein the level of lag is measured multiple times during the user's input.

18. The computer program product of claim 17, wherein the number of times the lag level is measured during the user's input is dynamically adjustable.

19. A computer system comprising the following:
  one or more processors;
  system memory;
  one or more computer-readable storage media having stored thereon computer-executable instructions that, when executed by the one or more processors, causes the computing system to perform a method for determining an appropriate neighborhood region for updating a node and edge layout of an interactive diagramming system, the method comprising the following:
    an act of receiving an input indicating that one or more selected nodes displayed in the interactive diagramming system are to be repositioned;
    an act of traversing one or more adjacent node edges to determine how many adjacent nodes are within a predefined distance from the selected node;
    an act of accessing one or more diagram parameters identifying diagram and node characteristics including an indication of one or more inter-node constraints that exist between the adjacent nodes;
    an act of actively measuring the level of lag between the user input related to the selected node and the diagramming system's modification to one or more of the adjacent nodes that are in the neighborhood region in response to the user input;
    an act of dynamically adapting at least one of the diagram parameters to maintain lag at a level below the maximum level of lag;
    an act of determining an appropriate neighborhood region based on both the determined number of adjacent nodes and the dynamically adapted parameters, including selecting the minimal neighborhood region to include a first node in the adjacent nodes based on the first node having a higher priority inter-node constraint within the adjacent nodes and to exclude a second node in the adjacent nodes based on the second node having a lower priority inter-node constraint within the adjacent nodes; and
    an act of updating the position of the selected node and routing the affected edges of those nodes and corresponding edges that are affected by the repositioning of the selected node and are determined to be within the neighborhood region.

20. The system of claim 19, wherein the node edges are routed such that edge routing paths of the node edges are kept minimally short while also minimizing edge overlaps.

* * * * *